UNITED STATES PATENT OFFICE.

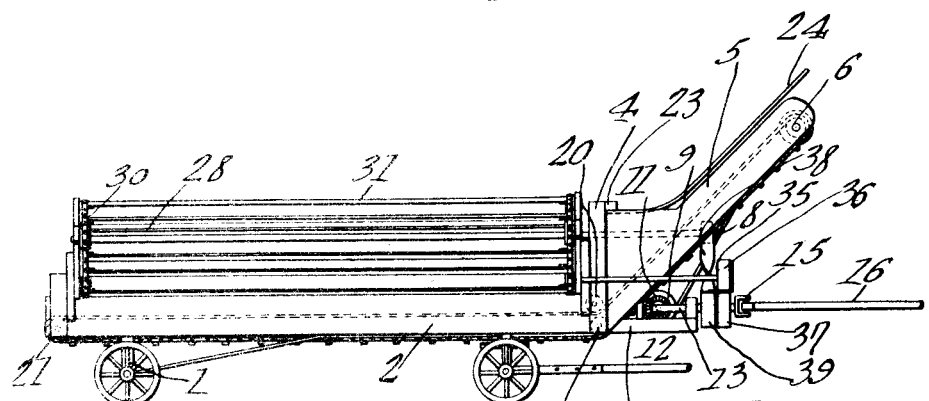

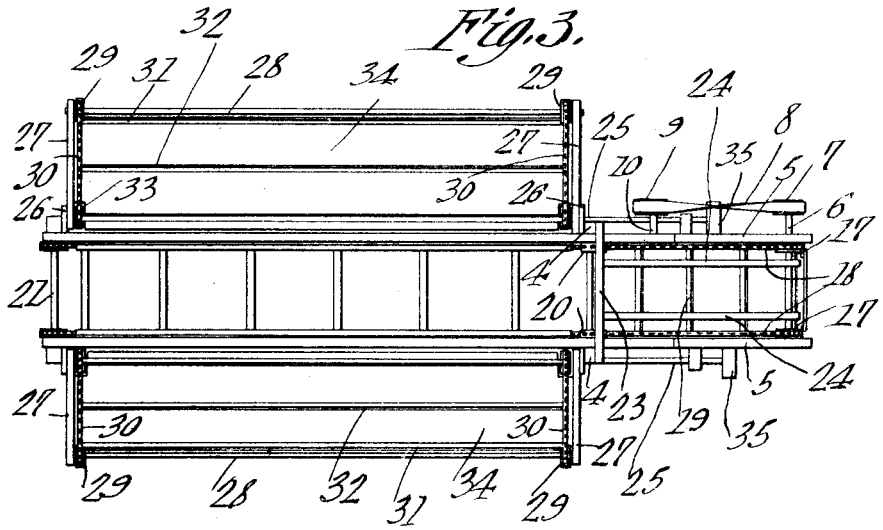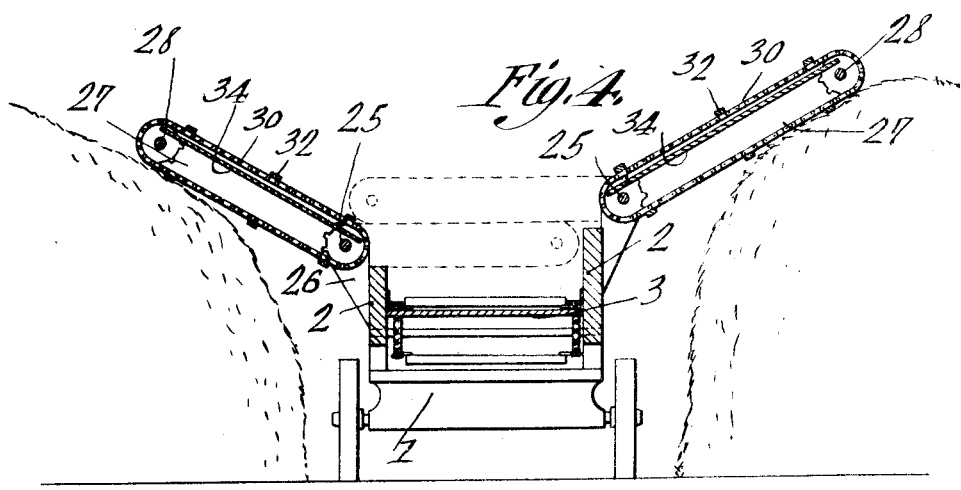

PETER SCHLAGECK, OF GRINNELL, KANSAS.

EXTENSION-FEEDER FOR THRESHING-MACHINES.

1,180,442.  Specification of Letters Patent.  Patented Apr. 25, 1916.

Application filed May 15, 1915. Serial No. 28,401.

*To all whom it may concern:*

Be it known that I, PETER SCHLAGECK, a citizen of the United States, residing at Grinnell, in the county of Gove and State of Kansas, have invented a new and useful Extension-Feeder for Threshing-Machines, of which the following is a specification.

This invention relates to an extension feeder for threshing machines, one of the objects of the invention being to provide a machine of this character which is light in construction, can be coupled readily to a thresher, and has laterally extending conveyers hingedly mounted and capable of resting upon stacks at opposite sides of the feeder so that it is thus possible to supply grain readily to the feeder without the necessity of pitching it, as heretofore, the said side conveyer automatically working downwardly as the stacks of grain diminish in size.

Heretofore it has been the practice to employ a number of men for the purpose of pitching the grain into the thresher, but this handling of the grain has resulted in a considerable waste and is also objectionable because of the cost involved in the employment of a number of men for this purpose.

The object of the present invention is to provide means whereby the labor required to feed the thresher can be reduced to one-half, and, as it is unnecessary to pitch the grain as heretofore, waste is practically eliminated, especially in windy weather.

A further object is to provide an extension feeder the side conveyers of which can be readily folded to inactive position, thus to facilitate the transportation of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, the preferred form of invention has been shown.

In said drawings: Figure 1 is a side elevation of the invention; Fig. 2 is an enlarged end elevation thereof, the draft cock and the drive shaft being shown in section. Fig. 3 is a top plan view. Fig. 4 is an enlarged vertical transverse section through the machine, the positions of the side conveyers when folded being indicated by dotted lines.

Referring to the figures by characters of reference 1 designates wheel supported bolsters on which are secured side boards 2 of the machine, there being a platform 3 extended longitudinally between the side boards and adapted to support the upper side of a conveyer as hereinafter pointed out. Standards 4 are arranged at the front ends of the side boards 2 and extending from the standards are side boards 5 which are inclined upwardly away from the standards.

Journaled within the upper end portions of the side boards 5 is a transverse shaft 6 provided at one end with a pulley 7 adapted to receive motion through a friction belt 8 from a pulley 9 secured to the transverse shaft 10, on which is secured a beveled gear 11. This beveled gear meshes with a beveled gear 12 secured to a longitudinal shaft 13 journaled on an extension frame 14 at the front end of the machine and a universal joint 15 connects the front end of the shaft 13 to a shaft section 16 adapted to receive motion from the mechanism of the thresher.

The shaft 6 is provided with sprockets 17 engaging the chains 18 of an endless conveyer, this conveyer having transverse slats 19 adapted to travel upwardly along an inclined board 18 arranged between the side boards 5 and extending from the front end of the platform 3. The upper side of the conveyer extends longitudinally along the top of platform 3, it passing under idlers 20 at the front end of platform 3 and around a shaft 21 at the rear end of the platform, the bottom side of the conveyer passing under the platform, under idlers 22 at the front end of the platform and thence under the inclined board 18 to the shaft 6.

A cross bar 23 is secured to the standards 4 and extending from this cross bar are spring fingers 24 which are arranged parallel with the board 18 for the greater portion of their length, thus to hold the material in engagement with the upper side of the conveyer.

Guide shafts 25 are extended longitudinally along each side of the machine, these shafts being journaled in suitable laterally extending brackets 26 provided therefor.

Pivotally mounted on each shaft 25 are side boards 27 in the outer ends of which are journaled shafts 28 which are parallel with the shafts 25 and are provided with sprockets 29 engaging the chains 30 of endless side conveyers 31, these chains being connected by cross slats 32. The chains are driven by sprockets 33 on the shaft 25 and arranged under the upper flights of the side conveyers 31 are boards 34 which connect side boards 27.

The front end of each shaft 25 is provided with a pulley 35 and one of these pulleys is driven by a belt 36 engaging a pulley 37 on shaft 13 while the outer pulley 35 is driven by a twisted belt 38 engaging a pulley 39 on shaft 13. Thus it will be seen that during the actuation of shaft 13, the upper flights of the two side conveyers will move inwardly toward the central longitudinal conveyer and, at the same time, the upper flight of the said longitudinal conveyer will move forwardly over platform 3 and thence upwardly along the inclined board 18, thus to deliver to a threshing machine any material directed onto the longitudinal conveyer.

In using the machine herein described the same is coupled to a threshing machine and may be positioned between two stacks of grain, as shown in Fig. 4, the side conveyers resting loosely on the stacks. The grain is then pitched onto the side conveyers and will be carried thereby to the longitudinal conveyer which, in turn, will direct the grain into the threshing machine. As the size of each stack diminishes, the side conveyer will swing downwardly by gravity, so that it will always be in position to receive readily the grain removed from the stack. The side conveyers can swing to points close to the ground and, consequently, there is no danger of the grain being wasted by wind, as is the case where it is necessary at times to lift the grain considerable distances from the ground.

It will be noted that one of the shafts 25 is higher than the other shaft 25 and, consequently, one of the side conveyers can be swung inwardly above the longitudinal conveyer after which the other side conveyer can also be swung inwardly to the position shown by dotted lines in Fig. 4. With the parts thus disposed, the machine can be readily transported.

What is claimed is:—

An extension feeder for threshing machines, including an endless central conveyer having a substantially horizontal portion and an upwardly and outwardly inclined portion, shafts extending longitudinally of the feeder at the sides thereof, one of said shafts being higher than the other, a structure pivotally mounted on each shaft, said structures being adapted to fold inwardly to position above the central conveyer, an endless side conveyer mounted upon and movable with each structure, said structures being shiftable to position laterally beyond the feeder and adapted to swing freely in a downward direction, and means for simultaneously actuating all of the conveyers irrespective of their relative positions.

In testimony that I claim the foregoing as my own, I have hereto affixed my signature in the presence of two witnesses.

PETER SCHLAGECK.

Witnesses:
  J. E. BORAH,
  J. H. DAVIS.